United States Patent
Terry (10) Patent No.: US 6,178,161 B1
(45) Date of Patent: Jan. 23, 2001

(54) COMMUNICATIONS METHODS AND APPARATUS

(75) Inventor: John Brian Terry, Cumming, GA (US)

(73) Assignee: Nortel Networks Corporation, Montreal (CA)

(*) Notice: Under 35 U.S.C. 154(b), the term of this patent shall be extended for 0 days.

(21) Appl. No.: 08/962,298

(22) Filed: Oct. 31, 1997

(51) Int. Cl.⁷ ............................. H04L 5/14; H04L 12/413
(52) U.S. Cl. .......................................... 370/276; 370/445
(58) Field of Search ..................... 370/276, 277, 370/278, 279, 280, 281, 201, 286, 290, 295, 296, 445, 447, 252, 253; 375/222

(56) References Cited

U.S. PATENT DOCUMENTS

| | | | |
|---|---|---|---|
| 4,761,796 | * 8/1988 | Dunn et al. | 375/1 |
| 5,337,251 | * 8/1994 | Paster | 364/484 |
| 5,526,410 | * 6/1996 | Jacobs | 379/100 |
| 5,541,955 | * 7/1996 | Jacobsmeyer | 375/222 |
| 5,726,984 | * 3/1998 | Kubler et al. | 370/349 |
| 5,727,151 | * 3/1998 | Sugahara et al. | 395/200.13 |
| 5,802,287 | * 9/1998 | Rostoker et al. | 395/200.8 |
| 5,835,529 | * 11/1998 | Koga et al. | 375/202 |
| 5,859,875 | * 1/1999 | Kato et al. | 375/267 |
| 5,872,810 | * 2/1999 | Phillips et al. | 375/222 |
| 5,907,553 | * 5/1999 | Kelly et al. | 370/433 |

\* cited by examiner

*Primary Examiner*—Ajit Patel
*Assistant Examiner*—Brian Nguyen
(74) *Attorney, Agent, or Firm*—Foley & Lardner (57) ABSTRACT

Ethernet frames are communicated via a telephone line between master and slave modems using half duplex communication of data and control information to avoid collisions, data to be transmitted being buffered in each modem. Different communication modes, involving different transmitted symbol frequencies, modulation methods, and bits per symbol to provide different transmission rates, can be used depending on errors on the line. To reduce signal attenuation and interference both of which increase with increasing frequency, a lowest frequency communication mode is used for transmitting control information when there is no data in the buffer for transmission, whereas a higher transmission rate communication mode is used for transmission of data and control information when the buffer is not empty. The communication mode can also be adjusted in dependence upon signal to noise ratio, signal and noise energies being monitored by the modem receiver respectively during and in a quiet period immediately following each received signal burst. Changes especially to a higher transmission rate communication mode can be made selectively depending upon a monitoring in the quiet period by the modem receiver of noise in the higher communication mode, the relevant signal to noise ratio being determined from this and a stored signal level for this mode.

13 Claims, 4 Drawing Sheets

COMMUNICATIONS METHODS AND APPARATUS

REFERENCE TO RELATED APPLICATIONS

Reference is directed to Terry et al. U.S. patent application Ser. No. 08/640,705 filed May 1, 1996, now U.S. Pat. No. 5,912,895 entitled "Information Network Access Apparatus And Methods For Communicating Information Packets Via Telephone Lines", and to Terry U.S. patent application Ser. No. 08/691,486 filed Jan. 15, 1997, entitled "Reducing Crosstalk Between Commnunications Systems", the entire disclosure of each of which is hereby incorporated herein by reference.

These applications, referred to below as the related applications, relate to methods and apparatus which can be used in particular to facilitate remote access via conventional twisted pair telephone lines to computer networks such as the global computer information network which is generally known as the Internet and is referred to herein as the Network, and for reducing crosstalk between communications systems. The present invention is not limited to the arrangements of these related applications, but can be applied in a particularly convenient manner in such arrangements.

This invention relates to communications methods and apparatus. The invention is particularly, but not exclusively, concerned with half duplex, or burst mode, communications systems, and with operation of such systems in a manner to reduce crosstalk or other interference of such systems between themselves and with other communicatons systems. The invention is particularly, but also not exclusively, applicable to communications via twisted pairs of wires in telephone cables used historically for providing telephone service to subscribers and now being used increasingly to provide additional communications services, for example for data communications and computer network connections.

BACKGROUND OF THE INVENTION

The communications arrangements and methods of the related applications provide a network access arrangement in which access to a CSMA/CD (Carrier Sense Multiple Access with Collision Detection) network, such as the Network using Ethernet frames, is provided via a telephone line by providing a master modem at the head end and a slave modem at the subscriber end of the line, and in which crosstalk with communications on other telephone lines can be reduced. The master modem provides a CSMA/CD interface to the Network and controls half duplex, or burst mode, communications with the slave modem via the line to avoid collisions of Ethernet frames on the line. The Ethernet frames are enveloped in frames on the line with error checking information; control information between the modems is contained in the same and/or in separate frames. Multiple Ethernet frames can be concatenated in a single frame on the line. The modulation method and signal bandwidth can be varied depending on errors to provide optimum conmmunications capacity via any particular line, and a ratio of upstream to downstream frames can be varied depending on buffer fills at the modems. The modulated signal frequencies are above telephone signal frequencies so that each telephone line can be frequency diplexed for simultaneous telephone communications.

In such communications arrangements, as in any communications system, it is desirable to provide, for the two directions of communication, an optimum, e.g. the greatest possible, capacity consistent with avoiding errors both in this communications arrangement and in other communications arrangements with which there may be crosstalk.

Object of this invention are to provide improved methods of transmitting information and improved communications apparatus.

SUMMARY OF THE INVENTION

According to one aspect of this invention there is provided a method of transmitting information comprising the steps of: buffering at least some information to be transmitted; selecting different ones of a plurality of communication modes depending upon amounts of buffered information to be transmitted; and transmitting information using the selected communication mode.

The information to be transmitted can comprise data packets and control or response packets, the data packets being buffered, and the selection of the communication mode can be dependent upon a number of buffered data packets to be transmitted. The plurality of communication modes can comprise different symbol transmission frequencies and/or different modulation methods and/or bits per symbol providing a plurality of different transmitted bit rates.

The step of selecting different ones of the plurality of communication modes can comprise selecting a communication mode providing a relatively lower transmitted bit rate in response to there being no buffered data packets to be transmitted and selecting a communication mode providing a relatively higher transmitted bit rate when there are buffered data packets to be transmitted, and in particular can comprise selecting a communication mode having a relatively low symbol transmission frequency in response to there being no buffered data packets to be transmitted and selecting a determined one of the communication modes when there is at least one buffered data packet to be transmitted. The use of a lower frequency reduces signal levels and coupling during relatively idle (no data tansmission) times, so that over many similar communications there is an aggregate reduction in interference and a consequent increase in aggregate communications capacity. The determined one of the communication modes can be adaptively determined in dependence upon at least one communication parameter, such as signal to noise ratio, for the transmitted information.

Another aspect of the invention provides a method of transmitting control information and data in a communications system having a plurality of communication modes providing different transmitted bit rates, comprising the steps of: buffering the data; selecting one of said communication modes providing a relatively low transmitted bit rate for transmission of control information in response to there being no buffered data for transmission; and selecting another of said communication modes providing a relatively higher transmitted bit rate for transmission of control information and data in response to there being buffered data for transmission.

This method can include the steps of defining signal to noise ratios for the communication modes and determining said another of said communication modes in dependence upon the determined signal to noise ratios.

A further aspect of the invention provides a method of communicating information in a communications system having a plurality of communication modes providing different transmitted bit rates using different symbol transmission frequencies and/or different modulation methods and/or bits per symbol, comprising the steps of: establishing communications using one of said communication modes providing a first transmitted bit rate; establishing communications using another of said communication modes providing a second transmitted bit rate greater than the first transmitted bit rate; communicating control information and data using said another of said communication modes; and in the absence of data to be communicated, communicating control information using said one of said communication modes. This method may include the steps of storing data to be communicated in a buffer, and selecting said communication modes in dependence upon data in the buffer.

The invention also provides communications apparatus comprising: a buffer for buffering data to be transmitted via a communications path; a transmitter for transmitting data from the buffer and control information via the communications path using any of a plurality of communication modes providing different transmission rates; and a control unit for monitoring an amount of data in the buffer, supplying the control information for transmission, and controlling the communication mode of the transmitter; wherein the control unit is arranged for controlling the transmitter to use one of the communication modes for transmitting control information in the absence of data to be transmitted from the buffer and at least one different communication mode for transmitting control information and data from the buffer, said one communication mode providing a lower transmission rate than said at least one different communication mode.

The apparatus preferably includes an Ethernet interface coupled to the control unit and to the buffer for supplying data to the buffer, and a digital-analog converter responsive to digital signals from the transmitter into analog signals for transmission via the communications path.

The invention further provides a modem for coupling between first and second communications paths, the first communications path providing for communication of data frames in a CSMA/CD (Carrier Sense Multiple Access with Collision Detection) network and the second communications path providing for communication of data of said frames and control information using half duplex communications with a complementary modem, the modem comprising: a first buffer for buffering information received via the first path for transmission via the second path; a control unit; a transmitter for transmitting data from the first buffer and control information from the control unit via the second path; a receiver for receiving information from the second path; and a second buffer for buffering information received by the receiver for supply to the first path; wherein the transmitter and receiver are operable under the control of the control unit in any of a plurality of communication modes providing different transmission rates in each direction on the second path, and the control unit is responsive to data in the first buffer for controlling the transmitter to use different communication modes providing respectively lower and higher transmission rates in the absence and presence of data to be transmitted from the first buffer.

According to another aspect of this invention there is provided a method of determining a signal to noise ratio on a communications path of a communications system in which signals are transmitted in bursts, comprising the steps of: monitoring signal energy received via the communications path during a signal burst; monitoring noise energy received via the communications path between successive signal bursts; and determining a signal to noise ratio from the monitored signal and noise energies.

Preferably the communications system provides half duplex communications on the communications path, and the noise energy received via the communications path is monitored during a monitoring period following receipt of a signal burst via the communications path and before transmission of a signal burst in an opposite direction via the communications path. The communications system can provide for any of a plurality of communication modes providing different transmission rates for the signal bursts on the communications path, the method preferably further comprising the step of changing the communication mode for signal bursts in dependence upon the determined signal to noise ratio.

The step of changing the communication mode can comprise changing to a communication mode providing a lower transmission rate in response to the determined signal to noise ratio falling below a threshold, and changing to a communication mode providing a higher transmission rate in response to the determined signal to noise ratio exceeding a threshold. The step of changing to a communication mode providing a higher transmission rate in response to the determined signal to noise ratio exceeding a threshold can advantageously further comprise the steps of: monitoring noise energy received via the communications path between successive signal bursts for communications using the communication mode providing the higher transmission rate; determining a signal to noise ratio for the communication mode providing the higher transmission rate from a stored signal energy and the monitored noise energy for this communication mode; and selectively changing to the communication mode providing the higher transmission rate in dependence upon the defined signal to noise ratio for this communication mode.

A further aspect of the invention provides, in a half duplex communications system having a plurality of communication modes providing different transmitted bit rates using different symbol transmission frequencies and/or different modulation methods and/or bits per symbol, a method of changing the communication mode comprising the steps of: monitoring signal energy of a signal received using a current communication mode; monitoring noise energy received using the current communication mode following a received signal and before transmission of a signal; determining a signal to noise ratio for the current communication mode from the monitored signal and noise energies; and changing the communication mode in dependence upon the determined signal to noise ratio. The method can further comprise the step of monitoring an error rate of communications using the current communication mode, the step of changing the communication mode being dependent upon the monitored error rate as well as the determined signal to noise ratio.

Yet another aspect of the invention provides communications apparatus comprising: a receiver for receiving information via a communications path; a transmitter for transmitting information via the communications path; and a control unit for controlling half duplex communications of the receiver and transmitter; wherein the receiver is configurable under the control of the control unit to use any of a plurality of communication modes providing different transmission rates on the communications path, and the control unit and receiver are arranged to: determine signal energy of a signal received using a current communication mode; determine noise energy received using the current communication mode following a received signal and before transmission of a signal by the transmitter; and determine a signal to noise ratio for the current communication mode from the determined signal and noise energies, whereby the communication mode can be changed in dependence upon the determined signal to noise ratio.

BRIEF DESCRIPTION OF THE DRAWINGS

The invention will be further understood from the following description with reference to the accompanying drawings, in which.

DETAILED DESCRIPTION

Figure 1:
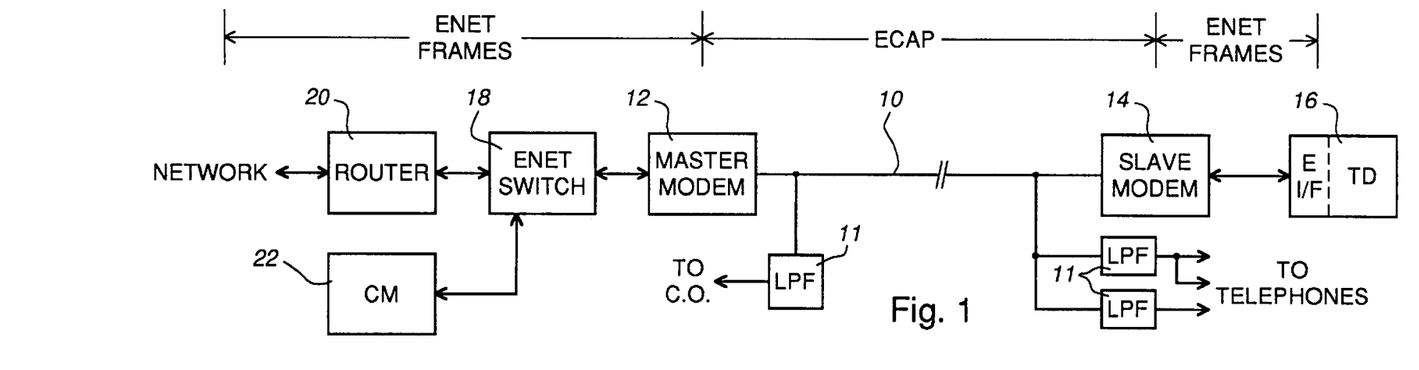
FIG. 1 illustrates a network access arrangement to which this invention is particularly applicable.

Referring to FIG. 1, a communications path, which in this example is in the form of a two-wire path constituted by a conventional telephone line 10, is coupled to a master modem 12 at the head or C.O. (central office) end of the line and to a slave modem 14 at the customer or subscriber end of the line. The telephone line 10 is also illustrated as being coupled via a low pass filter (LPF) 11 to the telephone C.O. (not shown) at the head end of the line, and via one or more LPFs 11 to one or more customer telephones at the customer end of the line. The LPFs 11 serve, in conjunction with high pass filters in the master and slave modems 12 and 14 as described below, as frequency diplexing filters which separate low frequency telephone signals, communicated between the telephones and the C.O., from higher frequency signals communicated between the modems 12 and 14, these signals being frequency-multiplexed on the line 10. Although not further described here, the master modem 12 can be multiplexed for similar communications via a plurality of telephone lines. In addition, although the telephone line 10 and filters 11 are referred to here, it can be appreciated that the invention is applicable to communications via any communications path, whether or not it comprises a telephone line or can carry telephone signals.

Each of the modems 12 and 14 includes an Ethernet interface of known form. At the customer end of the line 10, Ethernet (ENET) frames communicated via the slave modem 14 are coupled to an Ethernet interface (EI/F) of known form in a terminal device (TD) 16 which may for example be constituted by a personal computer. Thus Ethernet frames are communicated between the slave modem 14 and the terminal device 16 in known manner, for example using twisted pair wiring and the 10BASE-T CSMA/CD standard; this communication can be expanded in known manner into a more extensive LAN (local area network). At the C.O. end of the line, Ethernet frames communicated via the master modem 12 are coupled via an Ethernet hub or switch 18 and a router 20 to the rest of the Network (which can be considered to include the units 12 to 22) and optionally to a communications manager (CM) 22, for example constituted by a computer, whose functions can be as described later below.

As shown at the top of FIG. 1, Ethernet frames are thus communicated on the customer side of the slave modem 14 and on the Network side of the master modem 12. Between the modems 12 and 14, Ethernet frames are communicated using a point-to-point protocol which uses collision avoidance and for convenience is referred to as ECAP (Ethernet Collision Avoidance Protocol). This is outlined below and is further described in the related Terry et al. application.

The master and slave modems buffer Ethernet frames to be communicated downstream (from the master modem 12 to the slave modem 14) and upstream (from the slave modem 14 to the master modem 12). The ECAP communications of the buffered Ethernet frames involve half duplex transmission in which the master modem 12 has priority and control over the slave modem 14. Thus the master modem 12 determines when to send information downstream via the line 10, and informs the slave modem 14 when it is permitted to send information upstream via the line 10. To facilitate these communications, the information sent via the line 10 comprises not only the data packets of Ethernet frames but also control packets downstream and response packets upstream between the master and slave modems. The term "control" is used generically, where convenient herein, to embrace both the downstream control and the upstream response functions. The data and control packets are incorporated into ECAP frames which can take various forms, examples of which are described below with reference to FIGS. 2 and 3. Control units in the master and slave modems perform the necessary conversions between the Ethernet frames and ECAP data frames, and generate and respond to the ECAP control and response frames. Each of the master and slave modems 12 and 14 includes an Ethernet interface as described above and hence has a unique network address provided by this interface; these addresses are used to address messages (control and response packets) between the modems and can also be used for addressing the modems from other devices such as the CM 22 as described below. The modems can be combined with other units; in particular, the slave modem 14 can be combined with the Ethernet interface of the terminal device 16, the combined unit having a single network address.

Figure 2:
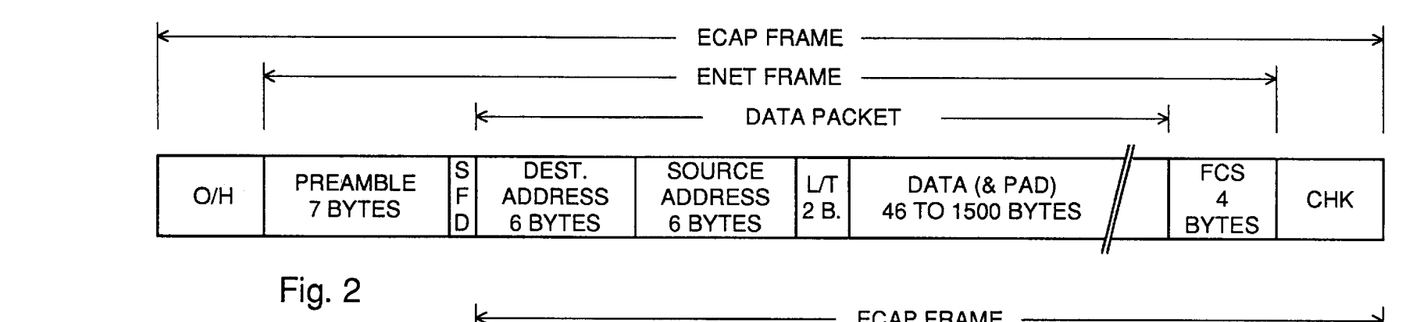
FIGS. 2 and 3 illustrate frame formats used in the arrangement of FIG. 1.

FIG. 2 illustrates one example of an ECAP data frame, comprising overhead information O/H, followed by a single Ethernet frame having the known form described below, followed by a check sequence CHK. It is observed that the term "Ethernet frame" is used herein to include frames in accordance with IEEE Standard 802.3 entitled "Carrier Sense Multiple Access with Collision Detection (CSMA/CD) Access Method and Physical Layer Specifications", which has been adopted by the International Organization for Standardization (ISO), and frames in accordance with the 1985 Version 2 Standard for Ethernet on which the 802.3 Standard is based, these being generally similar except for use of the length or type field discussed below.

The known form of the Ethernet frame consists of, in order, a preamble field of 7 bytes or octets; a start frame delimiter (SFD) field of 1 byte; a destination address field of 6 bytes; a source address field of 6 bytes; the length or type field of 2 bytes; a data field of 46 to 1500 bytes; and a frame check sequence (FCS) field of 4 bytes or octets constituted by a CRC (cyclic redundancy check) of the data packet constituted by the address, length or type, and data fields. Data of less than 46 bytes in a frame is padded to the minimum data field size of 46 bytes. The length or type field represents the length of data in the data field up to the maximum of 1500 bytes; a value greater than 1500 represents the type of data packet, IP (Internet Protocol) data packets being identified by one specific type value in this field. Thus each Ethernet frame comprises a data packet of from 60 to 1514 bytes, together with overhead (preamble, SFD, and FCS fields) of 12 bytes.

The two-wire telephone line 10 in the arrangement of FIG. 1 has a length which is generally much greater than the maximum segment length, of the order of 100 meters, of twisted pair wiring which is dictated by the CSMA/CD operation of Ethernet, and signal delays and attenuation make it impractical to use CSMA/CD on the telephone line 10. Instead, the Ethernet frame is included in the ECAP frame of FIG. 2 and communicated using the collision avoidance protocol of the half duplex communications between the modems 12 and 14.

The O/H field at the start of the ECAP frame for example consists of a few bytes comprising a preamble and start-of-frame (SOF) indication of a suitable form for the modulation method in use by the modems 12 and 14, possibly followed by other information such as an ECAP frame sequence number for frame identification in known manner (e.g. for identifying frames for acknowledgement or retransmission). The check sequence CHK at the end of the ECAP frame conveniently comprises a CRC sequence which can be produced in exactly the same manner as the FCS field of the Ethernet frame, the CRC operating on all of the information in the ECAP frame following the SOF indication up to and including the FCS at the end of the Ethernet frame. The check sequence CHK could alternatively take other forms, for example it can comprise any desired form of error detecting and/or correcting information. As shown in FIG. 2, the Ethernet frame is enveloped, intact and without any change, within the ECAP frame.

Alternatively, as described in the related Terry et al. application, parts of the Ethernet frame, such as the preamble and SFD fields and any pad in the data field, can be stripped from the Ethernet frame at the sending modem and reinserted at the receiving modem to reduce the amount of information to be transmitted via the line 10. Thus whereas transmission of undersized frames is not possible in a CSMA/CD arrangement because of the nature of the contention scheme (undersized frames are generally interpreted as collisions), in this ECAP scheme collisions are avoided by the protocol between the modems so that short frames are not only permitted but can be desirable because they reduce the amount of information that must be communicated via the line 10.

Figure 3:
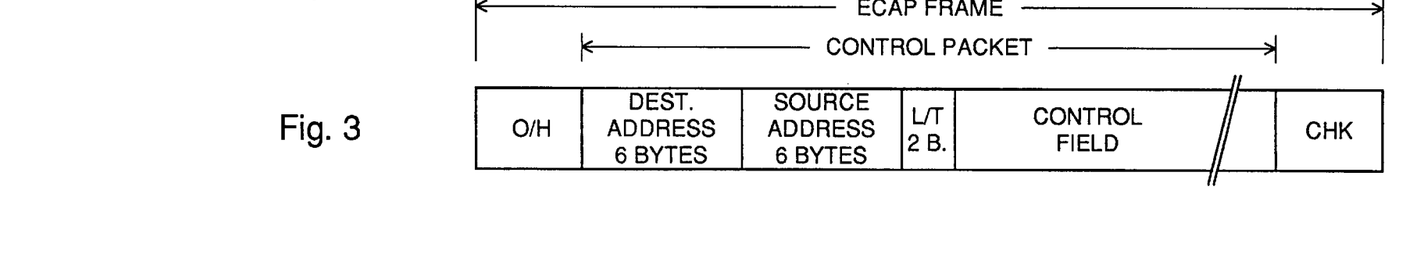

FIG. 3 illustrates an ECAP control frame comprising a control packet to be communicated from the master modem 12 to the slave modem 14. The control frame comprises an initial overhead field O/H as described above, followed by a control packet described below, and the check field CHK providing a CRC sequence for all of the information in the ECAP frame following the SOF indication up to the end of the control packet. The control packet comprises destination and source address fields, a length/type field L/T, and a control field which is generally much shorter than the minimum 46 byte data field of an Ethernet frame and whose length is given by the contents of the field L/T. For such a control packet the destination and source addresses are the Network addresses of the master modem 12 and the slave modem 14, respectively.

Conversely, an ECAP response frame can have the same form as the control frame shown in FIG. 3, except that it contains a response field instead of the control field, and the destination and source addresses are exchanged because the response frame is sent from the slave modem 14 to the master modem 12.

Other ECAP frame formats can alternatively be provided; for example control and response fields can be added to data frames, and a plurality of Ethernet frames can be concatenated in an ECAP fame.

Figure 4:
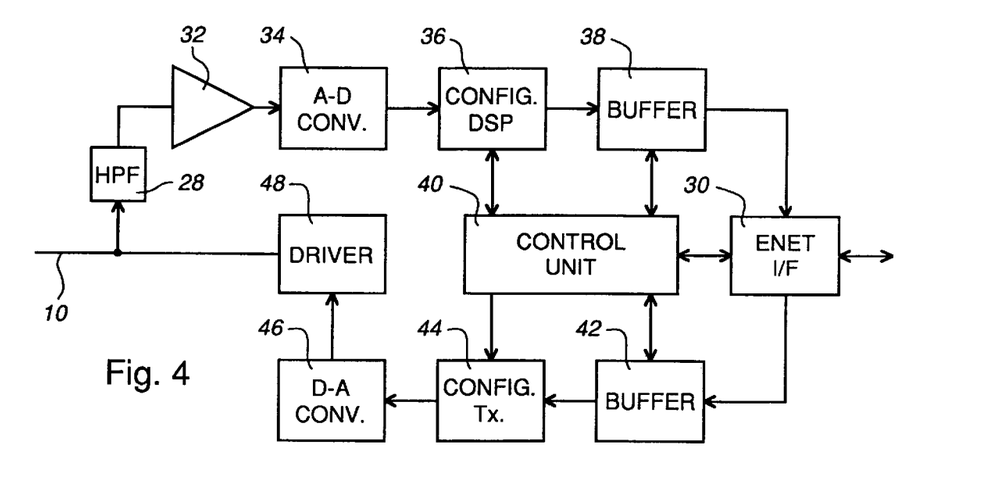
FIG. 4 illustrates parts of a modem used in the arrangement of FIG. 1.

Referring now to FIG. 4, each of the modems 12 and 14 includes a high pass filter 28, as discussed above, connected to the line 10, and an Ethernet interface (ENET I/F) 30 for connection to the terminal device 16 or Ethernet switch 18. Analog signals received via the line 10 are supplied via the HPF 28 and a pre-amplifier 32 to an analog-digital (A-D) converter 34 to be converted into digital form, the digital signals being passed via a receiver constituted by a configurable DSP (digital signal processor) 36 to a buffer 38. Control or response information is supplied from the buffer 38 to a control unit 40 (the control or response information can alternatively be supplied, or can be considered to be supplied, directly from the DSP 36 to the control unit 40), and data in the buffer 38 is passed on in the Ethernet frames to the interface 30. In the opposite direction, a buffer 42 receives and buffers Ethernet frame data from the interface 30 and supplies this to a configurable transmitter (Tx.) 44 under the control of the control unit 40, which also supplies control or response information to the transmitter and controls its configuration for different communication modes as described below. Digital signals of the resulting ECAP frames are supplied from the transmitter 44 to a digital-analog (D-A) converter 46, whose analog signal output is supplied via a line driver 48 to the line 10 which is also connected to the line driver. For example, the line driver 48 can comprise a current generator driving an impedance equal to the characteristic impedance of the line 10. As stated above, components of the master modem 12 can be multiplexed for a plurality of lines 10. Parts of the modems 12 and 14 can conveniently be implemented in one or more DSPs or ASICs (application specific integrated circuits).

The control unit 40 controls the operation of the modem as either a master modem 12 or a slave modem 14. For a master modem 12, Ethernet frames are exchanged via the interface 30 between the Network and the buffers 38 and 42. The control unit 40 controls encapsulation into ECAP frames of Ethernet data frames from the buffer 42 and control information which it generates for the slave modem 14, and controls the downstream transmission of these via the transmitter 44, converter 46, line driver 48, and the line 10. The control information includes polls which permit the slave modem 14 to transmit in the upstream direction, whereby the master modem ensures half duplex transmission on the line 10 without collisions between the downstream and upstream transmission directions. Upsteam ECAP frames are received via the HPF 28, pre-amplifier 32, converter 34, and DSP 36, with response information being supplied to the control unit 40 and Ethernet data frames being supplied via the buffer 38 to the Ethernet interface 30.

Conversely, for a slave modem 14, ECAP frames on the line 10 are received via the HPF 28, pre-amplifier 32, converter 34, and DSP 36, with control information being supplied to the slave modem's control unit 40 and Ethernet data frames being supplied via the buffer 38 and Ethernet interface 30 to the terminal device 16. In response to a poll in the control information received from the master modem, the control unit 40 in the slave modem controls transmission upstream of one or more frames containing response information and/or Ethernet data frames from the buffer 42 in the slave modem, as instructed by the master modem 12, via the transmitter 44, converter 46, line driver 48, and the line 10.

The control unit 40 in each modem also controls in known manner configuration of the DSP 36 and transmitter 44 of the modenm In particular, for example, it controls parameters of the transmitter 44 such as the on/off state, signal level, amplitude slope (variation in signal amplitude with frequency over the pass band), frequency or symbol rate, signal bandwidth, and modulation method (e.g. QPSK (quadrature phase shift keying) or QAM (quadrature amplitude modulation) and number of bits per symbol), which determine the transmission rate and PSD (power spectral density) of the transmitted signal. It independently controls similar parameters for the DSP 36.

Figure 5:
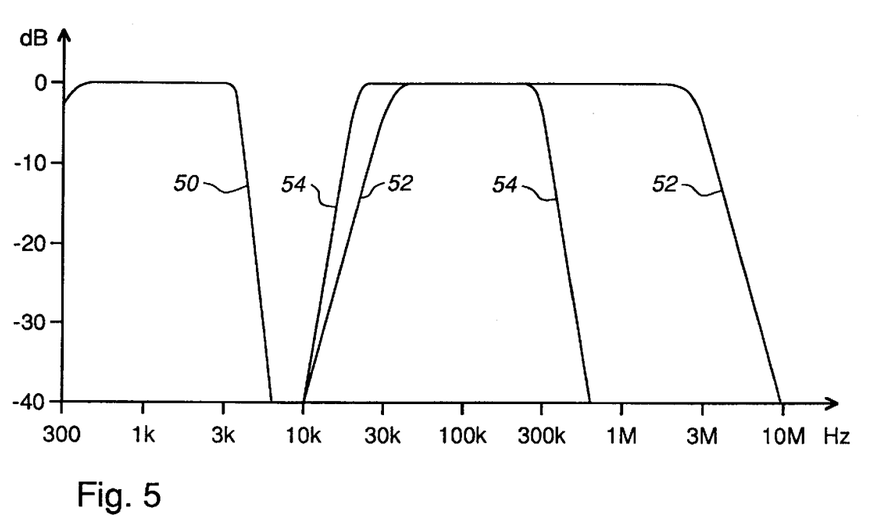
FIG. 5 shows a graph illustrating frequency characteristics related to the arrangement of FIG. 1.

FIG. 5 shows a graph illustrating the low frequency spectrum 50 of telephone signals which can be carried on the telephone line 10 and can be separated from signals communicated between the modems 12 and 14 by the LPFs 11. FIG. 5 also shows by way of example two high frequency spectra 52 and 54 for communications between the modems 12 and 14. The spectra 52 and 54 relate to two different signal bandwidths which can be used for the modem communications. For example, the relatively wide bandwidth spectrum 52 can correspond to a modulation method with a frequency of 3 MHz, and the relatively narrower bandwidth spectrum 54 can correspond to a modulation method with a frequency of 300 kHz. Other signal bandwidths, not shown, are similarly provided. The use of different bandwidths and modulation methods is described further below.

Communications on the line 10 between the modems 12 and 14 are controlled by the master modem 12. Briefly, the control unit 40 in the master modem 12 determines when downstream frames from the buffer 42 in the master modem, and/or control frames, are to be transmitted to the slave modem 14, and enables the slave modem to transmit upstream frames to the buffer 38 in the master modem 12, and/or response frames, only at times when there is no downstream transmission so that collisions between upstream and downstream information are avoided. The characteristics of the communications in each direction are determined by the control unit 40 in the master modem 12. These characteristics include parameters (e.g. modulation method and frequency or signal bandwidth) which are determined as further described below, and for example dynamic determination of relative allocations for downstream and upstream communications dependent upon buffer fills. Buffer fills are determined directly by the control unit 40 in the master modem 12 for its buffers, and are communicated to the control unit 40 of the master modem 12 in response frames from the slave modem 14 for the latter's buffers.

Alternatively and optionally, at least some of the communications characteristics can instead be determined remotely by the CM 22 with communications in Ethernet frames between the master modem 12 and the CM 22, and between the slave modem 14 and the CM 22 addressed either directly or via the master modem 12. For simplicity, it is assumed in the following description that all of the communications characteristics are maintained in the master modem 12 itself, but it can be appreciated that these characteristics can instead be maintained in and by the CM 22 or elsewhere, and communicated with the modems as may be desired.

Figure 6:
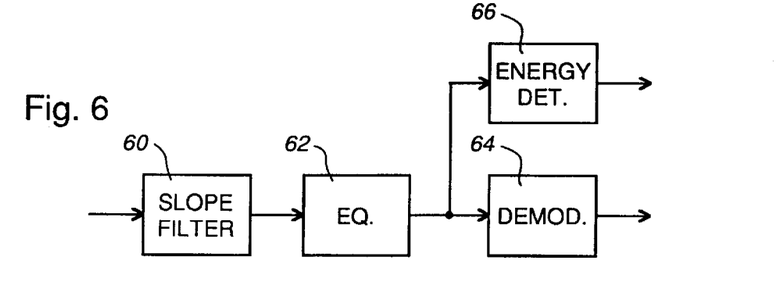
FIG. 6 illustrates receiver functions of a configurable DSP (digital signal processor) of the modem of FIG. 4.

FIG. 6 shows a block diagram of some of the receiver functions which are implemented in the configurable DSP 36 of each modem. As shown in FIG. 6, these functions include a slope filter 60, equalizer 62, demodulator 64, and an energy detector 66. The slope filter 60 is supplied with the digital output of the A-D converter 34 (FIG. 4) and serves to compensate for amplitude slope over the bandwidth of a received signal, and its output is supplied to the equalizer 62, which for example can be a 48-tap transversal equalizer. The output of the equalizer 62 is supplied to the demodulator 64, which serves to demodulate the signal in accordance with its modulation method to produce a demodulated signal at its output, and to the energy detector which serves to detect the level of any signal and noise at the output of the equalizer 62 and to produce at its output a detected energy signal for the control unit 40. These functions are made use of in operation of the modem as described below. It is observed that the term "noise" is used herein to include all types of noise and interference, and hence to include any component of a received signal that is not a desired signal.

The operation of the master and slave modems includes an initialization or training mode, in which the communications characteristics or parameters referred to above are set up for subsequent communications, and communication modes in which there may or may not be one or more Ethernet frames in the buffer 42 to be communicated via the line 10. The communication modes involve various modulation methods and frequencies or symbol rates (and hence signal bandwidths) as discussed above; for convenience these are regarded here as being in an ordered list from a lowest mode to a highest mode of communication.

The lowest mode can be constituted by a product of the least symbol rate and fewest bits per symbol provided by the modem, providing the greatest likelihood of successful communication between the modems but at a low transmission rate; for example this is assumed here to be QPSK at 62.5 ks/s (kilosymbols per second) providing a bit rate of 125 kb/s. The highest mode can be constituted by a product of the greatest symbol rate and most bits per symbol, providing a low likelihood of successful communication but at a high transmission rate; for example this may be 64 QAM at 2 Ms/s (megasymbols per second), or 16 QAM at 3 Ms/s, potentially providing a bit rate of 12 Mb/s. Between these lowest and highest mode examples, there are numerous possible combinations of modulation method, bits per symbol, and symbol transmission rates that can form elements of the ordered list and that may be used to provide different trade-offs between likelihood of successful communication and bit rate. For example, for each modulation method there may be several different possible symbol rates per decade between 62.5 ks/s and 3 Ms/s.

It can be appreciated that there may be different possible communication modes which have substantially the same total transmission rate, for example the two possibilities indicated above for the highest mode. Generally, in such instances the smaller bandwidth, or lower frequency, one of these will be preferred (e.g. 64 QAM at 2 Ms/s rather than 16 QAM at 3 Ms/s) because signal attenuation and coupling on the line 10 are generally lower for lower frequencies. In such cases, the higher frequency alternatives may optionally be excluded from the ordered list.

The following description refers to a current communication mode, meaning one of the modes in the ordered list that is currently being used for a particular line 10, and to higher and lower modes relative to the current communication mode. It can be appreciated that the higher and lower modes can refer to modes in the ordered list that are either immediately adjacent to the current mode or more distant from it in the list. For example, depending upon the manner in which the different modes are ordered, if the current mode is 16 QAM at 250 ks/s (a bit rate of 1 Mb/s), a next higher mode could be either 16 QAM at 375 ks/s (a bit rate of 1.5 Mb/s) or 64 QAM at 250 ks/s (also a bit rate of 1.5 Mb/s), the latter generally being preferable because of its lower frequency.

For initialization or training, with the master modem 12 operating in the absence of any response from the slave modem 14 (e.g. the slave modem may be not connected or not operating), the master modem 12 repeatedly transmits training bursts with pauses between them during which it monitors the line 10 for any response. More particularly, training bursts can be transmitted at a rate of about 10 per second, using the lowest mode and a signal amplitude sufficient for a maximum possible length (e.g. 21000 ft or 6400 m of 24-gauge wire) of the line 10, each training burst comprising a predetermined pseudo-random sequence which results in a substantially flat frequency spectrum of the transmitted burst.

An operating slave modem 14 connected to the line 10 receives these training bursts, the level of which will generally (for less than maximum-length lines) be sufficient to overload its A-D converter 34, and its energy detector 66 detects the presence of the bursts. The slave modem 14 transmits, in response in the pauses between the downstream training bursts, bursts which are similarly detected by the master modem 12. The master modem 12 (as controlled by its control unit 40) continues to send the training bursts but gradually reduces their signal amplitude until the A-D converter 34 of the slave modem is no longer overloaded, and the slave modem 14 (as controlled by its control unit 40) adjusts the gain of the pre-amplifier 32 to avoid signal clipping and to match an optimum signal input range of the converter. The slave modem 14 then further adjusts parameters of the slope filter to obtain a substantially flat frequency spectrum of the received signal. To this end the slave modem can determine the relative energy of signal components at the high and low ends of the signal bandwidth, for example by comparing the outputs of two slope filters having respectively positive and negative slope (attenuation relative to frequency), to determine a compensating slope of the slope filter 60.

The slave modem subsequently samples the received training bursts at the output of the equalizer 62, and uses a least mean squares (LMS) algorithm in conjunction with a stored copy of the training burst predetermined sequence to derive in non-real time an appropriate set of coefficients for the equalizer 62. It sets the coefficients of the equalizer 62 accordingly, and the (slope compensated and equalized) downstream training bursts consequently produced at the output of the equalizer 62 are supplied in the slave modem 14 to the demodulator 64, which during initialization provides for the desired QPSK demodulation. When a predetermined number of (e.g. 10 consecutive) training bursts have been correctly received in succession, the slave modem 14 concludes that it can receive correctly using the set of communications parameters (gain, slope filter parameters, and equalizer coefficients) that it has determined for the lowest mode.

A similar process is then performed for the opposite direction, with the slave modem 14 transmitting training bursts upstream to the master modem 12, which in a similar manner determines a corresponding set of communications parameters for the lowest mode. This process is simplified by the fact that downstream communications have been established, so that the master modem 12 can inform the slave modem directly what signal amplitude to transmit. The end of this process concludes the initialization, two-way communications in the lowest mode having been established between the modems, and the resulting sets of communications parameters are stored in the modems. At least some of the slave modem's parameters are transmitted to the master modem 12 so that they are also available there for the purposes described below.

Although this establishes two-way communications between the modems 12 and 14, this is not initially used for communications of any Ethernet frames between the buffers 42 and 38 because such data communications could prevent or delay adoption of a higher possible communication mode between the modems.

To determine at least one such higher mode for initial use for data communications, the master modem 12 determines from the gain parameters discussed above the loss of the line 10 (usually similar for both transmission directions) for the lowest mode frequency or symbol rate, and uses this determined loss in conjunction with a look-up table to predict the loss of the line 10 at other frequencies. Information in the look-up table, correlating relative line losses for different frequencies, is empirically determined. From this information, the master modem determines a frequency or symbol rate for an initial, and possibly optimum, communication mode on the particular line 10. For example, this frequency may be a little lower than a frequency for which a threshold level of the gain parameters is reached, thereby providing a high probability of successful communications at this frequency on the particular line 10. This process can also take into account predicted effects of the line 10 for the different modulation methods and bits per symbol, so that a reasonably close prediction of an optimum communication mode can be made.

Under the control of the lowest mode communications established as described above, the training processes described above are repeated for the determined initial mode for each direction of transmission. If successful, this establishes a current communication mode. If unsuccessful, then the same process is repeated for a lower initial mode, until a satisfactory current mode is determined. The determined parameters for the current mode are stored, for example, in the master modem 12. It can be appreciated that the current modes can be different for the two directions of transmission; this may especially be the case when there is differing interference towards the different ends of the line 10.

Data (ECAP frames including Ethernet frames) communications between the modems 12 and 14 are consequently provided as described above in the current communication mode. At times when no data is to be transmitted, i.e. when the buffers 42 of the modems 12 and 14 are empty, or as a background task, the training process described above is repeated between the modems for others of the communication modes, developing a set of communications parameters for successful communications modes, or determining that communications can not reliably be carried out using the respective communication mode on the particular line 10. This establishes a table of communications parameters for all of the usable communication modes, and this table can be similarly updated over time. Depending upon this table and the results of communications using the current mode (for example, an averaged proportion of total ECAP frames transmitted in error, as determined from the check sequence CHK in each fame), the current mode can be adjusted to be higher or lower to suit the particular line 10 and the prevailing circumstances.

The related Terry et al. application discloses such adaptation of the communication mode in dependence upon the monitored results of communications, and also discloses varying the relative numbers or proportion of downstream and upstream data frames in dependence upon monitoring of the fill states of the buffers. An aspect of the present invention goes beyond this, to variation of the communication mode in dependence upon the monitored fill states of the buffers, especially the buffer 42 in the transmit path of each modem.

More particularly, this aspect of the present invention recognizes that the higher the current communication mode is in the ordered list, the more likely it is to contribute to interference on other communications paths and/or to be susceptible to interference from other communication paths. This can be appreciated for example from the fact that attenuation of signals and coupling of interfering signals on the line 10 increases with increasing frequency, so that smaller bandwidth (i.e. lower frequency) signals can generally be transmitted with smaller signal amplitudes, and produce and are susceptible to less interference (e.g. near end crosstalk) between the line 10 and adjacent communication paths. In order to reduce the interference contributions and susceptibility, the communication mode can be adjusted to provide, within the limits of the ECAP communications on the line 10, a rate of data communications which is matched to the rate of data to be communicated. The fills of the transmit buffers 42, for the current communication mode and in relation to the current throughput of data, provide an indication of the rate of data to be communicated.

Figure 7:
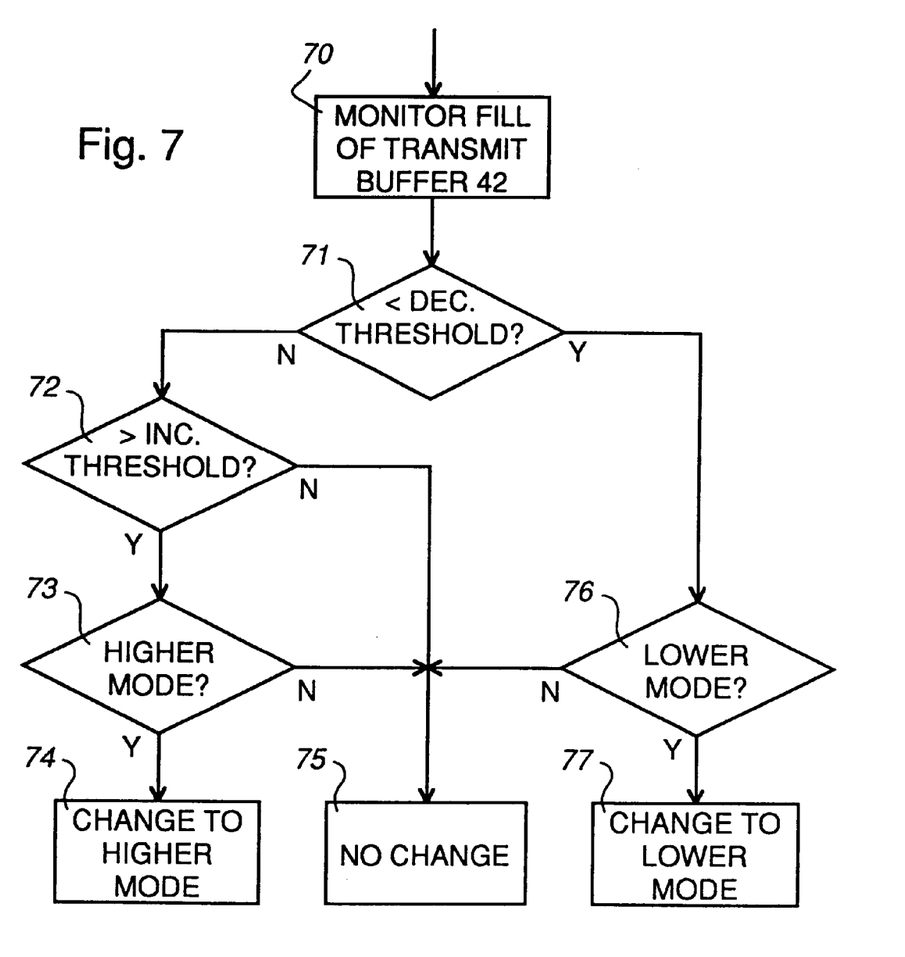
FIG. 7 illustrates a flow chart of steps carried out in an embodiment of one aspect of the invention.

To this end, FIG. 7 illustrates a flow chart of steps which can be carried out by the control unit 40 of the master modem 12 to adjust the communication mode adaptively in dependence upon the fill of the relevant transmit buffer 42. For the downstream communications, the control unit 40 of the master modem 12 monitors the fill of the buffer 42 in the master modem and controls the downstream communication mode directly. For the upstream direction, the control unit in the master modem is informed of the fill of the upstream transmit buffer 42 in the slave modem 14 via response messages sent upstream from the slave modem to the master modem as described above, determines the upstream communication mode to be used by the slave modem, and controls the slave modem accordingly via downstream control messages as described above. It can be appreciated that the control unit 42 in the master modem 12 can also determine adaptively at the same time the proportion of upstream and downstream ECAP frames, as well as carrying out the further processes described below.

Referring to FIG. 7, as indicated by a block 70, the control unit 40 of the master modem 12 monitors the fill state of the transmit buffer 42 for the respective direction of transmission, and determines at a block 71 whether this is below a threshold for decreasing the communication mode. If it is, and the control unit determines at a block 76 that a lower communication mode is available, then at a block 77 it makes a change to a lower communication mode. If the decision at the block 71 is negative, the control unit determines at a block 72 whether the monitored buffer fill is above a threshold for increasing the communication mode. If it is, and the control unit determines at a block 73 that a higher communication mode is available, then at a block 74 it makes an immediate change to a higher communication mode, so that the change is completed before the buffer 42 becomes full. In response to a negative decision in any of the decision blocks 72, 73, and 76, the control unit makes no change in the communication mode.

In a particularly simple and convenient implementation of this process, the threshold for decreasing the communication mode in the block 71 can be that the buffer 42 is empty for at least a predetermined period, for example 1 second, and the threshold for increasing the communication mode in the block 72 can be that the buffer 42 contains at least one Ethernet frame to be transmitted. Furthermore, the process can be implemented simply by changing between a determined optimum communication mode when data is to be transmitted, and the lowest communication mode when there has been no data to be transmitted for at least the predetermined period. However, it can be appreciated that other criteria can be used for the thresholds, and other and more communication modes can be used, as may be desired. For example, it can be appreciated that the lowest mode may provide a sufficient rate of data communications for a slow supply of Ethernet frames to the transmit buffer, so that a change need not necessarily made to a higher mode as soon as there is any data in the buffer 42.

In any event, a result of this process is that a lower, and desirably the lowest, mode of communication is used when there is little or no data to be transmitted, the lowest mode being more than sufficient for communication of the control or response ECAP frames in the respective direction of transmission, thereby reducing contributions and susceptibility to interference. A higher, and desirably optimum, communication mode is used for data to be transmitted, thereby reducing transmission delays and risks of overflow of the transmit buffer.

Although the process described above has been described as applying to both directions of transmission in the half duplex communications system described above, it can be appreciated that it can be applied for either or both directions of transmission, and is also applicable to other communications systems, including either or both directions of transmission in a full-duplex transmission system, in a similar manner. Thus this aspect of the invention is potentially applicable to any communication system having different communication modes and in which data can be buffered prior to transmission.

As discussed above and in the related Terry et al. application, the check sequences CHK in the ECAP frames are used to enable an averaged proportion of total ECAP frames transmitted in error to be determined, with the current communication mode being adaptively adjusted to suit the line 10 and the prevailing circumstances so that it constitutes an optimum mode. This provides a relatively slow and long term adaptation of the communication mode, which may be insufficient to take into account relatively short term effects. For example, as a result of the relatively slow averaging process, interference that may have a short duration, such as crosstalk from other communication paths carrying bursty communications signals, and bursty noise e.g. from amplitude modulated radio signals, can result in the communication mode being lowered only after the end of the interference. This results in the current communication mode generally being less than optimum.

Another aspect of this invention supplements this slow adaptation by responding more quickly to noise (including interference) on the line 10. In this aspect of the invention, noise on the line is monitored during periods when it is known that there is no desired signal on the line, for example immediately following each received ECAP frame or group or burst of ECAP frames, and a signal-to-noise ratio is determined which is used to provide a relatively short-term measure of conditions on the line 10.

More particularly, in an embodiment of this aspect of the invention, a short quiet or idle period of no transmission is provided following each ECAP frame, or following selected (either predetermined or as identified within the frames) ones of the ECAP frames. The duration of each quiet period can be predetermined and/or adaptively adjusted; for example it may be inversely dependent upon the symbol rate being used for the ECAP frames, for example being up to about 100 $\mu$s for the lowest communication mode symbol rate of 64 ks/s and generally being lower for higher symbol rates. For convenience and simplicity it is assumed in the following description that such a quiet period is provided following each ECAP frame burst in each direction of transmission, but it can be appreciated that different monitoring schemes can be provided, and the monitoring can be different for the two directions of communication, as may be desired.

Figure 8:
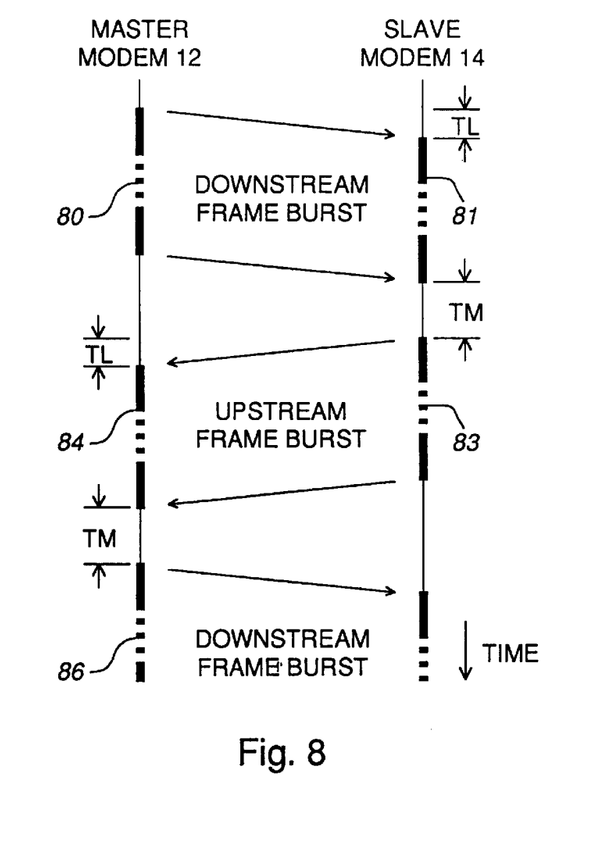
FIG. 8 illustrates signal flow between modems in operation of the arrangement of FIG. 1 in accordance with an embodiment of another aspect of the invention.

Pig. 8 is a diagram of signal flow between the master and slave modems 12 and 14, with time increasing in a downward direction in the diagram. A downstream ECAP frame burst 80 transmitted by the master modem 12 is received by the slave modem 14 as a burst 81 delayed by a line delay period TL dependent upon the length of the line 10. Following the end of the received burst 81, the slave modem 14 monitors the line 10 during a monitoring period TM, when neither the master modem nor the slave modem is transmitting any signal on the line 10. Conversely, an upstream ECAP frame burst 83 is transmitted by the slave modem 14 following the monitoring period TM, and is received by the master modem 12 as a burst 84 also delayed by the line delay TL. Following the end of the received burst 84, the master modem 12 also monitors the line 10 during a monitoring period TM, when neither the master modem nor the slave modem is transmitting any signal on the line 10, and subsequently transmits another downstream ECAP frame burst 86.

During each monitoring period TM, the respective modem 12 or 14 monitors noise (including interference) on the line 10 as described below. The timing of the monitoring periods in each case immediately after the end of a received frame burst as described above and illustrated in FIG. 8 ensures that noise, rather than the desired signal or reflections of it, on the line 10 is being monitored. The durations of these monitoring periods can be small compared to the burst durations, and can be less than signal processing delays involved in the receiver, so that there is relatively little or no loss of transmission capacity on the line 10 due to the provision of the monitoring periods. It is conceivable that even such small capacity loss as may be involved may be reduced, for example by providing the monitoring periods after the ends of transmitted bursts and compensating for reflections of the signal burst just transmitted, or reducing the relative number or duration of the monitoring periods.

During each received burst such as 81 and 84 in FIG. 8, the respective modem samples and averages the received signal plus noise energy (e.g. RMS and peak power levels), as determined by the energy detector 66. During the subsequent monitoring period TM, the respective modem similarly determines using the energy detector 66 the noise energy (RMS and peak power levels) on the line 10 in the absence of a signal. The control unit 40 determines at least one signal to noise (including interference) ratio (SNR) from the determined energies, and maintains a short-term average of this determined SNR, for example a rolling average over a few (e.g. 3) bursts and monitoring periods. In the case of the slave modem 14, the short-term average is communicated in response frames to the control unit of the master modem 12, or the determined energies are communicated in response frames to the control unit of the master modem which itself determines the short-term average SNR for the slave modem.

Figure 9:
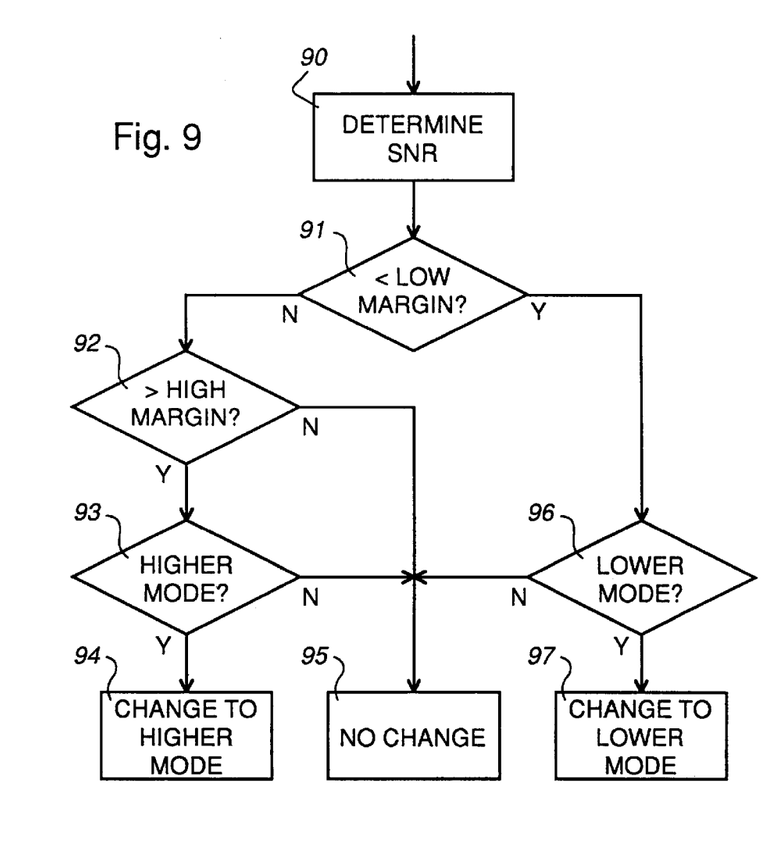
FIG. 9 illustrates a flow chart of steps carried out in such operation.

For each communication direction, the respective short-term average SNR is used by the control unit 40 of the master modem 12 to determine whether or not a change should be made to a lower or higher communication mode. FIG. 9 illustrates a flow chart of steps which can be carried out by the control unit 40 of the master modem 12 for each direction of transmission in this respect. It can be seen that the flow chart of FIG. 9 has a similar structure to the flow chart of FIG. 7, but uses different criteria in the decision process.

Referring to FIG. 9, as indicated by a block 90, the control unit 40 determines the short-term SNR for the respective direction of transmission as described above, and determines at block 91 whether this is less than a low margin or threshold for decreasing the communication mode. For example, for QPSK modulation a SNR of 15 dB may be required for demodulation, and the low margin may be 3 dB more than this, i.e. a SNR of 18 dB. If the SNR is below this low margin, and the control unit determines at a block 96 that a lower communication mode is available, then at a block 97 it makes a change to a lower communication mode. If the decision at the block 91 is negative, the control unit determines at a block 92 whether the SNR is greater than a high margin which indicates a possibility for increasing the communication mode. If it is, and the control unit determines at a block 93 that a higher communication mode is available, then at a block 94 it makes a change to a higher communication mode. In response to a negative decision in any of the decision blocks 92, 93, and 96, the control unit makes no change in the communication mode.

It can be appreciated that the low and high margin criteria in the decision blocks 91 and 92 may also involve minimum time periods during which the respective criteria must be maintained; these periods can be relatively short to ensure a rapid adaptation of the current communication mode to temporary noise and interference conditions. The relatively short-term process of FIG. 9 can be combined with the longer term process of adapting the communication mode depending on frame error rates as described above, and the combined process can also take into account the loss of communication capacity which arises (e.g. due to the need for control and response frames) from implementing each change in the communication mode.

Each decision in the block 93 or 96 of whether or not a higher or lower, respectively, communication mode is available can be made on the basis of the table of communications parameters that is established as described above for the initialization process. However, the control unit can also, or instead, base the decision on a more current determination of the SNR for the respective higher or lower communication mode to which a change may be made. To this end, the decision in each block 93 or 96 may involve one or more measurements, in monitoring periods TM as described above or in quiet periods on the line 10 otherwise provided under the control of the master modem 12, of the noise energy (RMS and/or power level) on the line 10 in the absence of a signal and for the communication mode to which a change is contemplated. This involves a change to the configurable DSP 36 to the higher or lower mode (via control and response frames under the control of the master modem 12 in the case of monitoring by the slave modem 14) for the noise monitoring and a change back to the current communication mode after the noise monitoring, and determination of the noise for the higher or lower mode using the energy detector 66 as described above. The control unit 40 of the master modem then determines the current SNR for the higher or lower mode from a stored signal plus noise energy for the mode determined from the table of communications parameters, in relation to the currently measured noise for the higher or lower mode, so that it can determine the availability and suitability of the higher or lower mode depending upon this current SNR.

It is observed that the above steps in relation to the decision blocks 93 and 96 may be carried out for either or both of the blocks 93 and 96, but the former is considered particularly desirable in determining when it is possible to adopt a higher communication mode than is currently used. Furthermore, this process can be carried out routinely as a background task, for either higher or lower communication modes, when communication conditions (e.g. buffer fills) permit, instead of or as well as being instigated by the results of the decision blocks 91 and 92. It is also observed that the process of determining SNR need not be concerned with the particular modulation method that is used, because relative SNRs for the different modulation methods for any frequency (or signal bandwidth) are established by knowing the SNR for any particular modulation method at the respective frequency. In addition, it is observed that a similar process can be performed as a part of the training process described above for determining the initial communication mode to be used for each direction of transmission.

The monitoring as described above can also be combined with the monitoring of power spectral density described in the related Terry application. Although as described above the monitoring periods TM are provided in quiet periods between the frame bursts when no signals are transmitted to the line 10, it is conceivable, as described in that application, that the monitoring could be carried out overlapped in time with the transmission of signal bursts on the line 10, with compensation for the signal to enable the noise energy to be determined. However, this is not preferred because detection of the noise in the presence of a signal is difficult in view of their different magnitudes, and would require a second set of receiver functions in each modem for simultaneous detection of the signal and noise.

It can be appreciated as indicated above that any of the functions described above as being carried out by the control unit 40 in the master modem 12 can optionally and alternatively be carried out by or under the control of the CM 22, relevant information being communicated between the master modem 12, and optionally also the slave modem 14, and the CM 22 for example via Ethernet frames in known manner. This enables functions of the master modem 12 to be simplified. The CM 22 can also provide operations, administration, management, test, and other functions in known manner.

Thus although particular embodiments of the invention have been described in detail, it should be appreciated that these and numerous other modifications, variations, and adaptations may be made without departing from the scope of the invention as defined in the claims. The invention also extends to the various possible combinations and subcombinations of the elements and features defined in the claims.

What is claimed is:

1. A method of transmitting information comprising the steps of:
    buffering at least some information to be transmitted;
    selecting different ones of a plurality of communication modes depending upon an amount of information buffered in said buffering step; and
    transmitting information using the selected communication mode;
    wherein the information to be transmitted comprises data packets and control or response packets, the data packets are buffered, and the selection of the communication mode is dependent upon a number of buffered data packets to be transmitted;
    wherein the plurality of communication modes comprise different symbol transmission frequencies and/or different modulation methods and/or bits per symbol providing a plurality of different transmitted bit rates; and
    wherein the step of selecting different ones of the plurality of communication modes comprises selecting a communication mode having a relatively low symbol transmission frequency in response to there being no buffered data packets to be transmitted and selecting a determined one of the communication modes when there is at least one buffered data packet to be transmitted.

2. A method as claimed in claim 1 wherein the determined one of the communication modes has a higher symbol transmission frequency than said relatively low symbol transmission frequency.

3. A method as claimed in claim 1 and comprising the step of adaptively determining the determined one of the communication modes in dependence upon at least one communication parameter for the transmitted information.

4. A method as claimed in claim 1 and including the step of determining signal to noise ratios for the communication modes for use in the selecting step.

5. A modem for coupling between first and second communications paths, the first communications path providing for communication of data frames in a CSMA/CD (Carrier Sense Multiple Access with Collision Detection) network and the second communications path providing for communication of data of said frames and control information using half duplex communications with a complementary modem, the modem comprising:
    a first buffer for buffering information received via the first path for transmission via the second path;
    a control unit;
    a transmitter for transmitting data from the first buffer and control information from the control unit via the second path;
    a receiver for receiving information from the second path; and
    a second buffer for buffering information received by the receiver for supply to the first path;
    wherein the transmitter and receiver are operable under the control of the control unit in any of a plurality of communication modes providing different transmission rates in each direction on the second path, and the control unit is responsive to data in the first buffer for controlling the transmitter to use different communication modes providing respectively lower and higher transmission rates in the absence and presence of data to be transmitted from the first buffer.

6. A method of determining a signal to noise ratio on a communications path of a communications system in which signals are transmitted in bursts, wherein the communications system provides for any of a plurality of communication modes providing different transmission rates for the signal bursts on the communications path, comprising the steps of:
    monitoring signal energy received via the communications path during a signal burst;
    monitoring noise energy received via the communications path between successive signal bursts;
    determining a signal to noise ratio from the monitored signal and noise energies; and
    changing the communication mode for signal bursts in dependence upon the determined signal to noise ratio,
    wherein the step of changing the communication mode comprises changing to a communicator mode providing a higher transmission rate, in response to the determined signal to noise ratio exceeding a threshold, comprising the steps of:

monitoring noise energy received via the communications path between successive signal bursts for communications using the communication mode providing the higher transmission rate;

determining a signal to noise ratio for the communication mode providing the higher transmission rate from a stored signal energy and the monitored noise energy for this communication mode; and selectively changing to the communication mode providing the higher transmission rate in dependence upon the determined signal to noise ratio for this communication mode.

7. A method as claimed in claim 6 wherein the communications system provides half duplex communications on the communications path, and the noise energy received via the communications path is monitored during a monitoring period following receipt of a signal burst via the communications path and before transmission of a signal burst in an opposite direction via the communications path.

8. A method as claimed in claim 6 wherein the step of changing the communication mode comprises changing to a communication mode providing a lower transmission rate in response to the determined signal to noise ratio falling below a threshold.

9. In a half duplex communications system having a plurality of communication modes providing different transmitted bit rates using different symbol transmission frequencies and/or different modulation methods and/or bits per symbol, a method of changing the communication mode comprising the steps of:

monitoring noise energy received using the current communication mode following a received signal and before transmission of a signal;

determining a signal to noise ratio for the current communication mode from the monitored signal and noise energies;

changing the communication mode in dependence upon the determined signal to noise ratio; and determining and storing signal energy for a new communication mode to which a change may be made from the current communication mode, wherein the step of changing from the current to the new communication mode comprises the steps of;

monitoring noise energy received using the new communication mode following a received signal using the current communication mode and before transmission of a signal;

determining a signal to noise ratio for the new communication mode from the stored signal energy and the monitored noise energy for the new communication mode; and selectively changing to the new communication mode in dependence upon the determined signal to noise ratio for the new communication mode.

10. A method as claimed in claim 9 wherein the step of changing the communication mode comprises changing to a communication mode providing a lower transmission rate in response to the determined signal to noise ratio falling below a threshold.

11. A method as claimed in claim 9 wherein the step of changing the communication mode comprises changing to a communication mode providing a higher transmission rate in response to the determined signal to noise ratio exceeding a threshold.

12. A method as claimed in claim 9 and further comprising the step of monitoring an error rate of communications using the current communication mode, wherein the step of changing the communication mode is dependent upon the monitored error rate as well as the determined signal to noise ratio.

13. Communications apparatus comprising:

a receiver for receiving information via a communications path;

a transmitter for transmitting information via the communications path; and a control unit for controlling half duplex communications of the receiver and transmitter;

wherein the receiver is configurable under the control of the control unit to use any of a plurality of communication modes providing different transmission rates on the communications path, and the control unit and receiver are arranged to;

determine signal energy of a signal received using a current communication mode;

determine noise energy received using the current communication mode following a received signal and before transmission of a signal by the transmitter;

determine a signal to noise ratio for the current communication mode from the determined signal and noise energies, whereby the communication mode can be changed in dependence upon the determined signal to noise ratio;

determine noise energy received using a new communication mode, to which a change may be made, following a received signal using the current communication mode and before transmission of a signal by the transmitter; and determine a signal to noise ratio for the new communication mode from a stored signal energy for the new communication mode and the determined noise energy for the new communication mode, whereby the current communication mode can be changed to the new communication mode selectively in dependence upon the determined signal to noise ratio for the new communication mode.

* * * * *